Patented Apr. 25, 1950

2,505,291

UNITED STATES PATENT OFFICE 2,505,291

WELDING FLUX

Ernest H. Lucas and John J. Shea,
Worcester, Mass.

No Drawing. Application May 24, 1946,
Serial No. 672,162

4 Claims. (Cl. 148—26)

This invention relates to an improved welding flux which is characterized by its ability to clean the work and to neutralize acids thereon, thus obviating to a large extent the preparation for welding of dirty, acid coated or impregnated, and otherwise contaminated workpieces.

The invention has among its objects the provision of an improved welding flux which is particularly advantageous in the welding of acid soaked cast metals. The flux is also useful in the welding of clean metals, and may be used for welding metals produced by other processes than by casting. The flux has proved to be particularly useful in the flame welding process.

Various other objects of the invention will become fully apparent in the following description.

In the past considerable difficulty has always been experienced in welding metals, particularly castings which are apt to be somewhat porous, which have been dipped in acid or have been exposed to an acid atmosphere. Typical of such articles are the cast aluminum bronze yoke bars which are used in the rod and wire cleaning houses. Such articles have been difficult to weld because commercially available welding fluxes have not been able to clean the work properly or to neutralize the acid with which the articles were coated or permeated. Successful welding of such parts in the past has required extensive preliminary cleaning treatments which were expensive and time consuming.

The welding flux of the present invention cleans dirty or badly oxidized work quickly and thoroughly. It has been found that the weld metal, when such flux is used, tins, flows, and builds up better than when prior fluxes are used. In addition, the composition of the flux is such that it effectively neutralizes any acid which may be present on the surfaces to be welded, or which works to such surface from the interior by reason of the application of the welding heat. Briefly, the improved flux consists wholly or predominantly of an intimate mixture, preferably dry, of an alkali metal borate, preferably a tetraborate, an alkali metal fluoride, and an alkali metal hydroxide. In the preferred embodiment the mixture consists predominantly of the tetraborate, roughly one-half as much fluoride as tetraborate, and one-sixth as much hydroxide as tetraborate. As will be apparent below such proportions are capable of considerable variation.

In its broadest aspect the flux may have the following composition:

|   | Per cent |
|---|---|
| Alkali metal borate, preferably tetraborate | 40–85 |
| Alkali metal fluoride | 10–40 |
| Alkali metal hydroxide | 5–20 |

In a preferred composition, which is illustrative of the flux of the invention, the following proportions of the ingredients may be used:

|   | Per cent |
|---|---|
| Alkali metal tetraborate | 60 |
| Alkali metal fluoride | 30 |
| Alkali metal hydroxide | 10 |

Although, as has been indicated, the above three ingredients of the flux may be salts of any alkali metal, it is preferred to use the sodium salts because of their cheapness and availability. The flux in such preferred modification therefore may have a composition within the following ranges:

|   | Per cent |
|---|---|
| Sodium tetraborate ($Na_2B_4O_7$) | 40–85 |
| Sodium fluoride (NaF) | 10–40 |
| Sodium hydroxide (NaOH) | 5–20 | and in a preferred composition within such range, it will have the following composition:

|   | Per cent |
|---|---|
| Sodium tetraborate ($Na_2B_4O_7$) | 60 |
| Sodium fluoride (NaF) | 30 |
| Sodium hydroxide (NaOH) | 10 |

The flux is prepared by grinding and intimately mixing the dry components together. Preferably the flux is applied as such dry mixture to the work, which is preferably when badly oxidized or otherwise contaminated, given a preliminary cleaning treatment. The flux will, however, under the influence of the welding heat, which may be furnished by a welding torch or by an electric arc for example, effectively remove dirt, oil, grease, and carbon and will neutralize the acids at the welding faces, and thus such preliminary cleaning may be dispensed with, if desired, in most cases.

It will be understood that the flux may be employed with other types of welding apparatus than those set out above, such as the atomic hydrogen torch, and in carrying out different welding procedures, such as pressure welding, and so forth. It is possible to apply the flux to the welding zone in various manners, as for instance by employing it as a light coating on the metal electrode, which likewise functions as the filler, in an arc welding process. For the welding of the bronze yoke bars, mentioned above, however, it is preferred to use flame welding with a filler rod, the flux being applied directly to the work.

The flux of the present invention is useful for welding various types of metal, the aluminum bronze articles mentioned specifically merely being typical. It can, for example, also be used in the welding of various other bronzes, cast iron, and brass, and displays advantages in producing a superior weld whether or not the workpieces are initially dirty or clean, or whether or not they are coated or impregnated with acid.

Having thus fully disclosed preferred embodiments of the improved welding flux of our invention, we desire to claim as new the following.

We claim:

1. A welding flux consisting of an intimate dry mixture of the following components, the percentages being by weight:

| | Per cent |
|---|---|
| Alkali metal tetraborate ($M_2B_4O_7$) | 40–85 |
| Neutral alkali metal fluoride (MF) | 10–40 |
| Alkali metal hydroxide (MOH) | 5–20 | wherein M represents any alkali metal.

2. A welding flux consisting of an intimate dry mixture of the following components in approximately the given percentages by weight:

| | Per cent |
|---|---|
| Alkali metal tetraborate ($M_2B_4O_7$) | 60 |
| Neutral alkali metal fluoride (MF) | 30 |
| Alkali metal hydroxide (MOH) | 10 | wherein M represents any alkali metal.

3. A welding flux consisting of an intimate dry mixture of the following components in approximately the given percentages by weight:

| | Per cent |
|---|---|
| Sodium tetraborate ($Na_2B_4O_7$) | 60 |
| Neutral sodium fluoride (NaF) | 30 |
| Sodium hydroxide (NaOH) | 10 |

4. A welding flux consisting of an intimate dry mixture of the following components in approximately the given percentages by weight:

| | Per cent |
|---|---|
| Sodium tetraborate ($Na_2B_4O_7$) | 40–85 |
| Neutral sodium fluoride (NaF) | 10–40 |
| Sodium hydroxide (NaOH) | 5–20 |

ERNEST H. LUCAS.
JOHN J. SHEA.

REFERENCES CITED

The following references are of record in the file of this patent:

UNITED STATES PATENTS

| Number | Name | Date |
|---|---|---|
| 1,675,664 | Reuss | July 3, 1928 |
| 2,267,763 | Streicher | Dec. 30, 1941 |
| 2,322,416 | Coleman et al. | June 22, 1943 |
| 2,344,195 | Anthony et al. | Mar. 14, 1944 |
| 2,357,014 | Merlub-Sobel et al. | Aug. 29, 1944 |